United States Patent
Kim et al.

(10) Patent No.: US 10,020,867 B2
(45) Date of Patent: Jul. 10, 2018

(54) INTERFERENCE MANAGEMENT FOR MOBILE RELAY IN FULL-DUPLEX RADIO COMMUNICATION SYSTEM

(71) Applicant: LG ELECTRONICS INC., Seoul (KR)

(72) Inventors: Kitae Kim, Seoul (KR); Jinmin Kim, Seoul (KR); Kwangseok Noh, Seoul (KR); Kukheon Choi, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 15/031,239

(22) PCT Filed: Apr. 30, 2014

(86) PCT No.: PCT/KR2014/003851
§ 371 (c)(1),
(2) Date: Apr. 21, 2016

(87) PCT Pub. No.: WO2015/060510
PCT Pub. Date: Apr. 30, 2015

(65) Prior Publication Data
US 2016/0269094 A1    Sep. 15, 2016

Related U.S. Application Data

(60) Provisional application No. 61/893,900, filed on Oct. 22, 2013.

(51) Int. Cl.
*H04B 7/155*   (2006.01)
*H04W 72/08*  (2009.01)
(Continued)

(52) U.S. Cl.
CPC .......... *H04B 7/155* (2013.01); *H04L 5/14* (2013.01); *H04W 4/06* (2013.01); *H04W 72/082* (2013.01); *H04B 7/026* (2013.01); *H04B 7/0413* (2013.01)

(58) Field of Classification Search
CPC . H04W 72/005; H04W 52/367; H04W 72/04; H04L 1/0003
See application file for complete search history.

(56) References Cited

U.S. PATENT DOCUMENTS

2009/0227264 A1   9/2009  Hwang et al.
2011/0223927 A1   9/2011  Seo et al.
(Continued)

FOREIGN PATENT DOCUMENTS

| KR | 10-2008-0034083 | 4/2008 |
|---|---|---|
| KR | 1020090105294 | 10/2009 |
| KR | 1020090122041 | 11/2009 |
| KR | 10-2013-0036937 | 4/2013 |

OTHER PUBLICATIONS

PCT International Application No. PCT/KR2014/003851, Written Opinion of the International Searching Authority dated Aug. 21, 2014, 10 pages.

(Continued)

*Primary Examiner* — Chandrahas B Patel
(74) *Attorney, Agent, or Firm* — Lee Hong Degerman Kang & Waimey

(57) ABSTRACT

In this disclosure, methods and apparatus for managing interference are disclosed. In one example, the first station receives the first signal from the base station. The first station acquires information on a specific processing scheme of a second station for processing the first signal to be transmitted to a third station at the second station. The first station receives a second signal from the base station while the second station transmits the first signal to the third (Continued)

station. Here, since the first station has knowledge on the first signal and the information on the specific processing scheme, it can manage interference caused by the first signal from the second station.

14 Claims, 15 Drawing Sheets

(51) Int. Cl.
- *H04L 5/14* (2006.01)
- *H04W 4/06* (2009.01)
- *H04B 7/026* (2017.01)
- *H04B 7/0413* (2017.01)

(56) References Cited

U.S. PATENT DOCUMENTS

| | | |
|---|---|---|
| 2012/0063369 A1 | 3/2012 | Lin et al. |
| 2013/0102244 A1 | 4/2013 | Oh et al. |
| 2013/0273926 A1 | 10/2013 | Peng et al. |
| 2016/0128097 A1* | 5/2016 | Pajukoski ............ H04L 5/0055 370/336 |

OTHER PUBLICATIONS

Korean Intellectual Property Office Application No. 10-2016-7010205, Notice of Allowance dated Dec. 5, 2017, 3 pages.

* cited by examiner

INTERFERENCE MANAGEMENT FOR MOBILE RELAY IN FULL-DUPLEX RADIO COMMUNICATION SYSTEM

CROSS-REFERENCE TO RELATED APPLICATIONS

This application is the National Stage filing under 35 U.S.C. 371 of International Application No. PCT/KR2014/003851, filed on Apr. 30, 2014, which claims the benefit of U.S. Provisional Application No. 61/893,900, filed on Oct. 22, 2013, the contents of which are all hereby incorporated by reference herein in their entirety.

TECHNICAL FIELD

The present invention relates to a wireless communication system, and more particularly, to methods for interference management for mobile relay in Full-Duplex Radio communication system, and apparatuses for the same.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Reducing interference, decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for interference management for mobile relay in Full-Duplex Radio communication system, and apparatuses for the same that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, methods and apparatuses are provided.

In one aspect, a method for receiving signals by a first station from a base station in a wireless communication system, the method comprising: receiving a first signal from the base station; acquiring information on a specific processing scheme of a second station for processing the first signal to be transmitted to a third station at the second station; receiving a second signal from the base station while the second station transmits the first signal to the third station; and managing interference caused by the first signal from the second station based on knowledge on the first signal and the information on the specific processing scheme, is provided.

The specific processing scheme may comprise one or more of a modulation and coding scheme, a precoding scheme and resource allocation scheme.

The first signal may be a broadcast signal broadcasted by the base station to multiple stations including the second station.

The information on the specific processing scheme may be acquired by receiving the information on the specific processing scheme from the second station or the base station. Otherwise, the information on the specific processing scheme may be acquired by estimating the information on the specific processing scheme at the first station.

In this example, the first station may be a mobile station directly served by the base station, the second station may be a relay station, and the third station may be another mobile station served by the relay station.

In another aspect, a method for relaying signals by a first station in a wireless communication system, the method comprising: receiving a signal from a base station; processing the received signal based on a specific scheme to be transmitted to a second station; transmitting the processed signal to the second station while at least one of the base station and a third station served by the base station is receiving another signal; and transmitting information on the specific scheme to at least one of the base station and the third station, is provided.

The information on the specific scheme may be used for at least one of the base station and the third station to manage interference caused by the transmission of the processed signal to the second station.

At least one of the base station and the third station may have knowledge on the received signal, and at least one of the base station and the third station may manage the interference based on the knowledge on the received signal and the information on the specific scheme.

The wireless communication system can use an FDR (Full-duplex radio) communication scheme.

In this example, the first station may be a relay station, the second station may be a mobile station served by the relay station, and the third station may be another mobile station directly served by the base station.

In another aspect, a method for receiving signals by a base station in a wireless communication system, the method comprising: transmitting a first signal to a first station; receiving, from the first station, information on a specific processing scheme for processing the first signal to be transmitted to a second station at the first station; receiving a second signal from a third station while the first station transmits the first signal to the second station; and managing interference caused by the first signal from the first station based on knowledge on the first signal and the information on the specific processing scheme, is provided.

In another aspect, a device operating as a first station for relaying signals in a wireless communication system, the device comprising: a transceiver for receiving a signal from a base station; and a processor connected to the transceiver and configured to process the signal received by the transceiver based on a specific scheme to be transmitted to a second station, wherein the processor controls the transceiver to transmit the processed signal to the second station while at least one of the base station and a third station served by the base station is receiving another signal, and to transmit information on the specific scheme to at least one of the base station and the third station, is provided.

In another aspect, a device operating as a first station for receiving signals from a base station in a wireless communication system; the device comprising: a transceiver for receiving a first signal from the base station, information on a specific processing scheme for processing the first signal to be transmitted to a third station at the second station, and a second signal from the base station while the second station transmits the first signal to the third station; and a processor connected to the transceiver and configured to manage interference caused by the first signal from the second station based on knowledge on the first signal and the information on the specific processing scheme, is provided.

In still another aspect, a device operating as a base station in a wireless communication system, the device comprising: a transceiver configured for transmitting a first signal to a first station, for receiving, from the first station, information on a specific processing scheme for processing the first signal to be transmitted to a second station at the first station, for receiving a second signal from a third station while the first station transmits the first signal to the second station; and a processor connected to the transceiver and configured to manage interference caused by the first signal from the first station based on knowledge on the first signal and the information on the specific processing scheme, is provided.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition.

Figure 2:
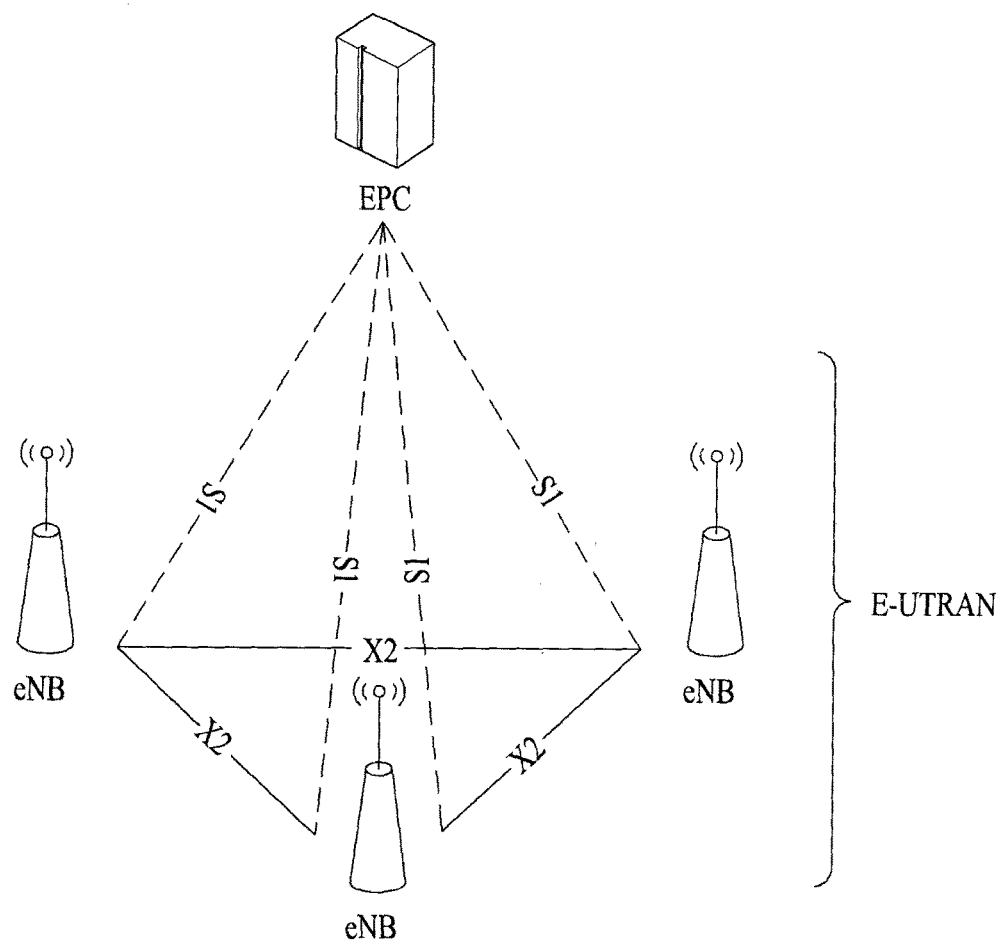
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
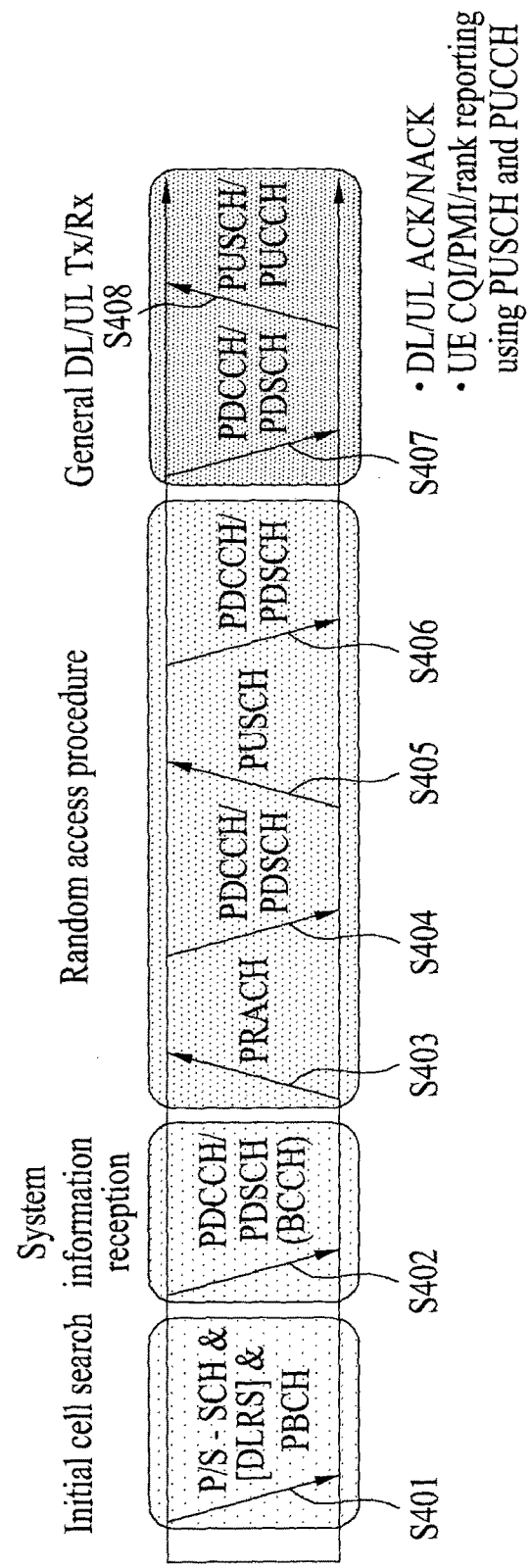
FIG. 3 is a diagram showing physical channels used in a 3GPP system and a general signal transmission method using the same.

FIG. 3 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

As described above, in the present invention, a method for cancelling interference between a UE serving as a mobile relay and a mobile base station in communication between a UE and a base station in a full-duplex radio (FDR) communication environment in which simultaneous transmission and reception is performed using the same time-frequency resources will be described. Unlike time division duplex (TDD) or frequency division duplex (FDD) which is a half-duplex mode, in FDR, since a base station and a UE simultaneously perform transmission and reception using resources of the same time-frequency region, uplink/downlink interference simultaneously occurs between transmission and reception links. Since a mobile relay which is a use case of FDR may reproduce unnecessary interference due to interference characteristics of FDR, interference caused by the mobile relay should be controlled in order to sufficiently guarantee communication performance.

In the present invention, a self-interference cancellation method of FDR is used to process link-to-link interference caused by a desired signal transmitted by a mobile relay. Therefore, it is possible to guarantee stable reception performance at receivers of a base station and a neighbor UE.

Figure 4:
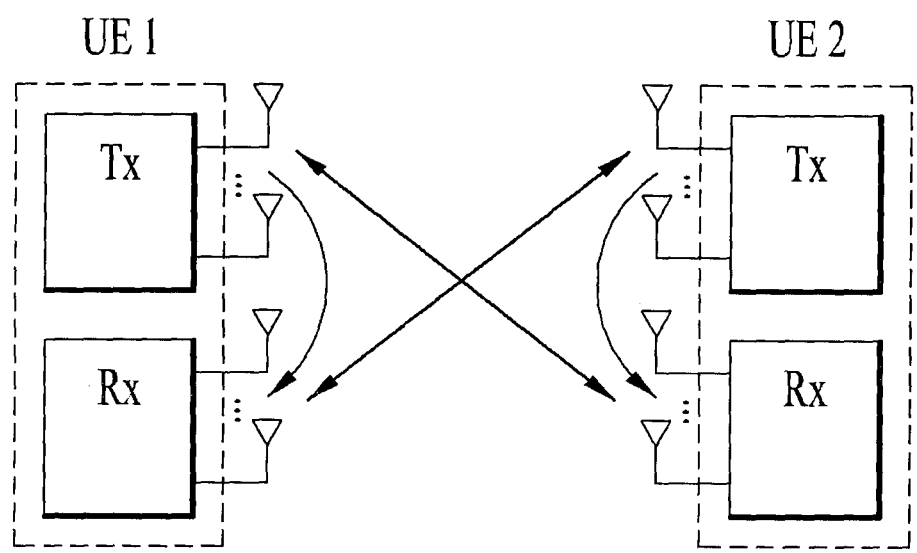
FIG. 4 is a diagram for explaining Full-Duplex Radio (FDR) Communication system.

FIG. 4 is a diagram for explaining a Full-Duplex Radio (FDR) Communication system.

In general, full duplex refers to technology of supporting transmission of a base station (BS) or a UE without separating uplink/downlink in terms of time/frequency. That is, as shown in FIG. 4, since a UE 1 and a UE 2 performs uplink/downlink communication using the same time/frequency resources, each UE performs transmission and, at the same time, receives a signal from another base station or UE. Accordingly, as shown in a curve of FIG. 4, a signal transmitted by a UE may be directly input to a receive antenna of the UE, thereby causing self-interference.

In a multi-cell environment, new interference or increased interference caused by introduction of FDR is as follows.
Self-user interference
Multi-user interference
Inter BS (or eNB) interference FIG. 5 is a diagram for explaining interferences in an FDR system.

Self-user interference means that a signal transmitted by a UE may be directly input to a receive antenna of the UE to cause self-interference as shown in FIG. 4. In general, since self-interference is stronger than a desired signal by about 60 to 90 dB, it is important to completely cancel self-interference using a cancellation method.

Figure 5:
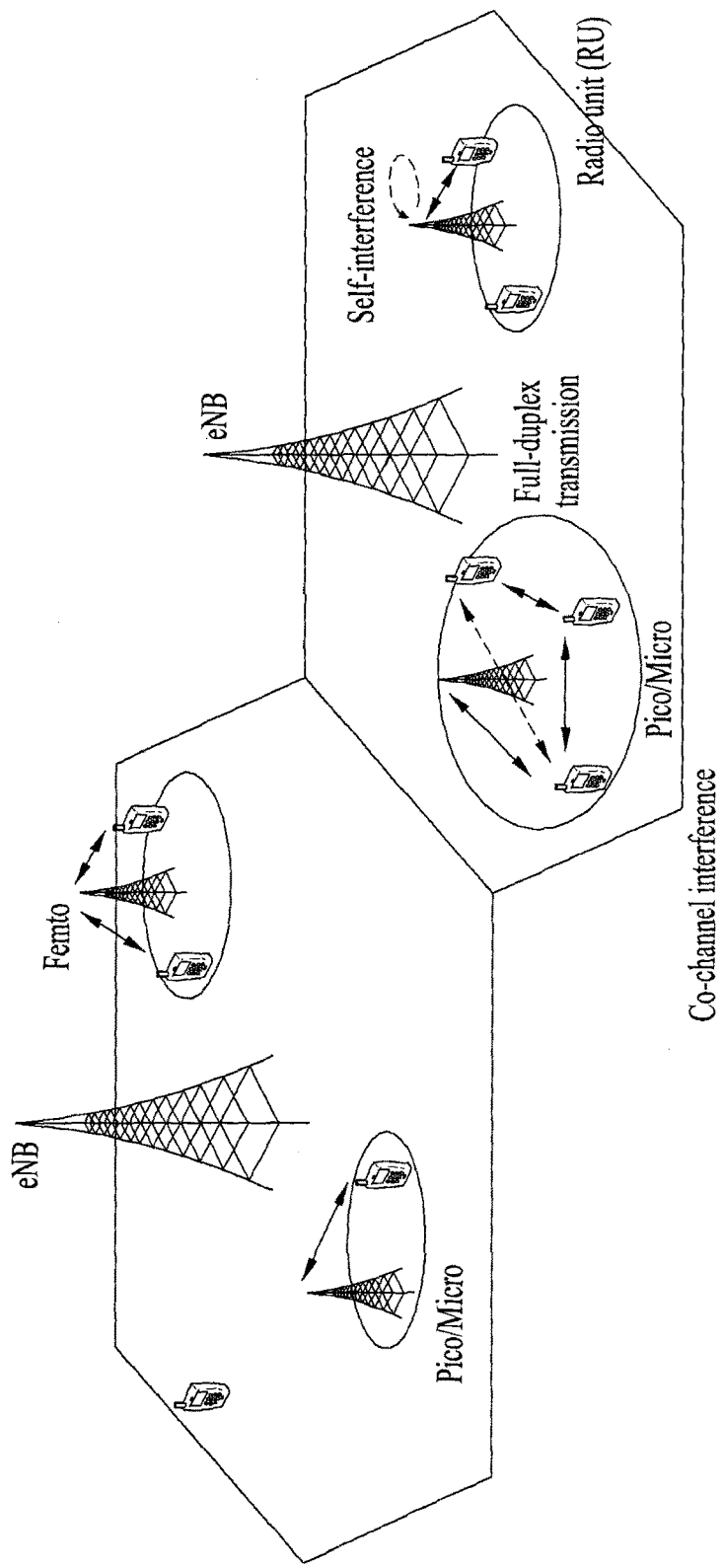
FIG. 5 is a diagram for explaining interferences in FDR system.

Second, multi-user interference refers to interference between UEs as shown in FIG. 5. In a legacy communication system, since a half-duplex method (e.g., FDD or TDD) in which uplink and downlink are separated from each other in terms of frequency or time is implemented, interference is not caused between uplink and downlink. However, in full-duplex transmission, since uplink and downlink share the same time/frequency resources, as shown in FIG. 5, interference is always caused between a BS and neighbor UEs for transmitting data.

Finally, inter BS interference refers to interference caused between BSs. This is equal to multi-user interference and interference is always caused due to sharing of uplink/downlink resources between BSs. That is, FDR may increase frequency efficiency by sharing the same time/frequency resources between uplink and downlink but restrict frequency efficiency improvement due to such interference increase.

Hereinafter, a method for managing interference will be described.

Figure 6:
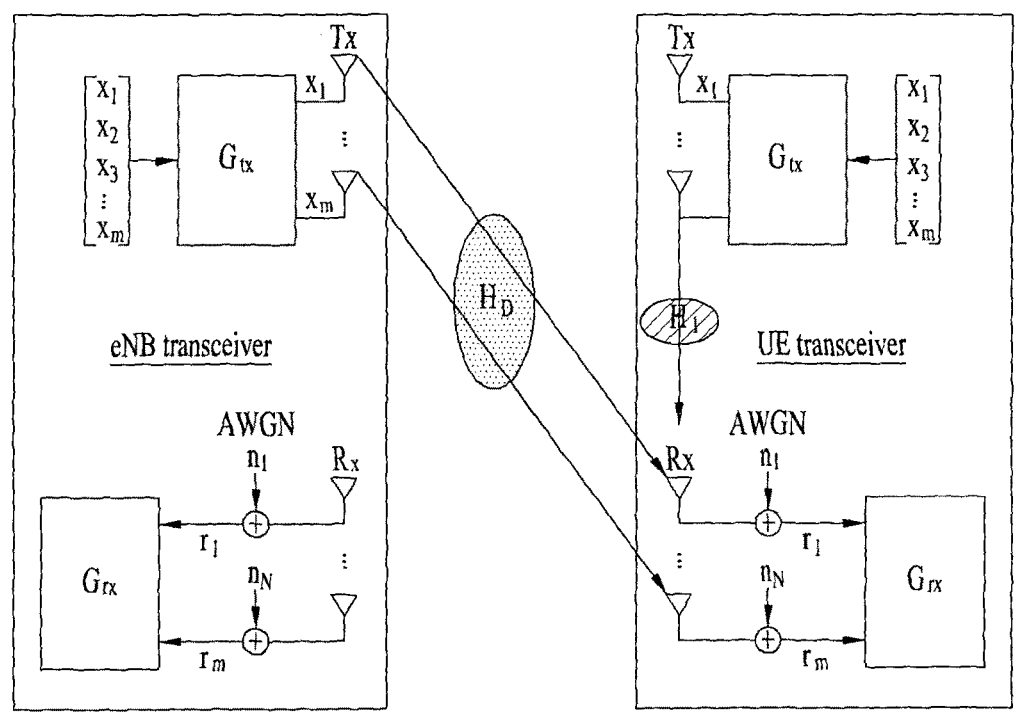
FIG. 6 is a diagram for modelling interference in FDR communication system.

FIG. 6 is a diagram for modelling interference in an FDR communication system.

In an FDR communication environment, an FDR communication environment shown in FIG. 6 is assumed in order to explain a conventional self-interference cancellation method. An eNB and a UE may simultaneously perform transmission and reception using the same time-frequency resources. At this time, in order to explain a self-interference cancellation method, the conventional interference cancellation method will be described via a procedure of cancelling self-interference from a signal received by a receiver of a UE.

Assume that both the eNB and the UE of FIG. 6 have multiple antennas.

Figure 7:
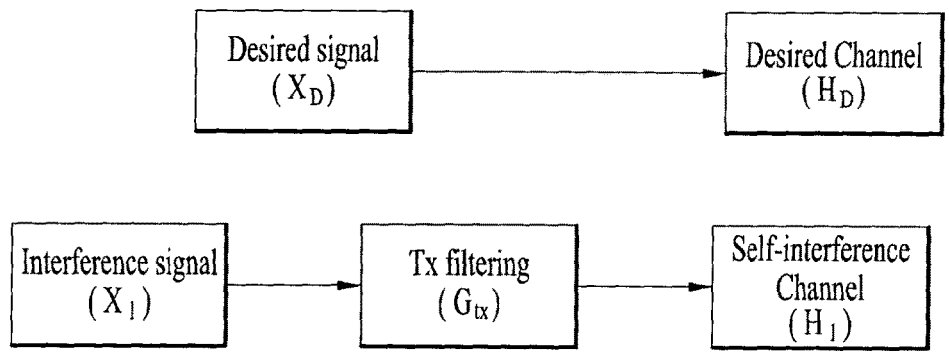
FIGS. 7 and 8 respectively represent transmitting and receiving structure with multiple antennas in FDR system.
Figure 8:
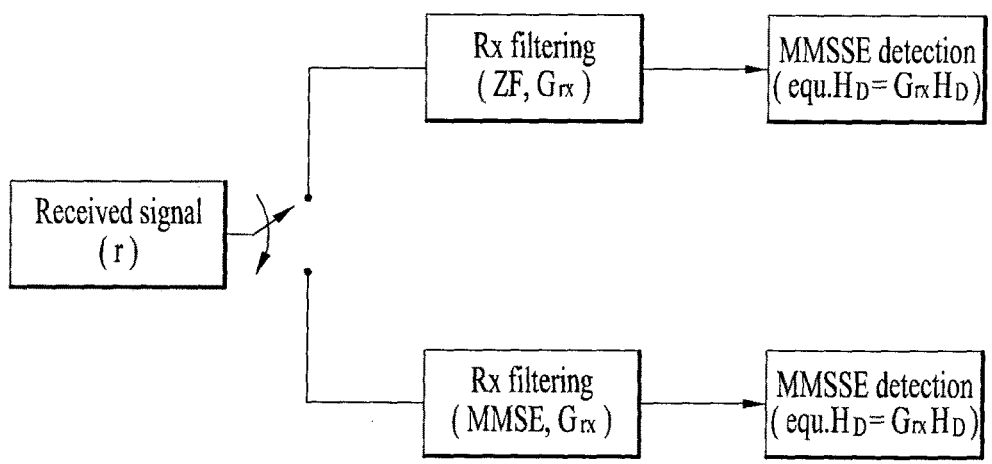

Number of transmit antennas of the eNB: Mtx
Number of receive antennas of the eNB: Mrx
Number of transmit antennas of the UE: Ntx
Number of receive antennas of the UE: Nrx FIGS. 7 and 8 respectively represent transmitting and receiving structures with multiple antennas in an FDR system. Here, the receive antenna of the UE may simultaneously receive a desired signal ($H_D$) and a self-interference signal ($H_I$).

When the self-interference cancellation method though filtering is not applied to a transmitter and receiver, the overall signal received by the receiver of the UE is expressed as follows.

$$r = H_D X_D + H_I X_I + n \qquad \text{[Equation 1]}$$

Desired channel: $H_D = N_{rx} \times M_{tx}$
Self-interference channel: $H_I = N_{rx} \times N_{tx}$
Desired signal at the tx of eNB: $X_D = [x_1, x_2, \ldots, x_{M_{tx}}]^T$
Interference signal at the tx of UE: $X_I = [x_1, x_2, \ldots, x_{N_{tx}}]^T$
AWGN noise: $n = [n_1, n_2, \ldots, x_{N_{rx}}]^T$
Received signal: $r = [r_1, r_2, \ldots, r_{M_{rx}}]^T$
Tx filtering: $G_{tx}$
Rx filtering: $G_{rx}$ Here, Tx filtering $G_{tx}$ is commonly applicable and an identity matrix is applicable.

Figure 9:
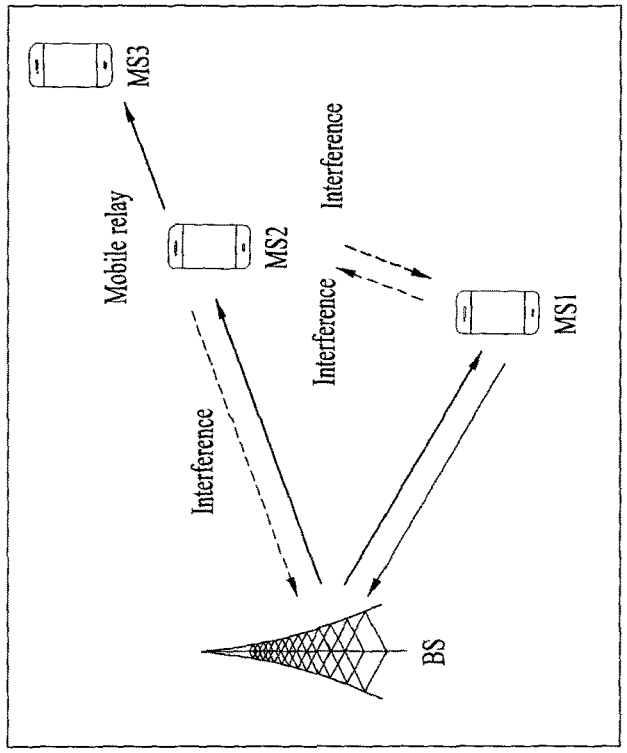
FIG. 9 shows an exemplary system to employ preferred embodiment of the present invention.
Figure 9:
Figure 9:
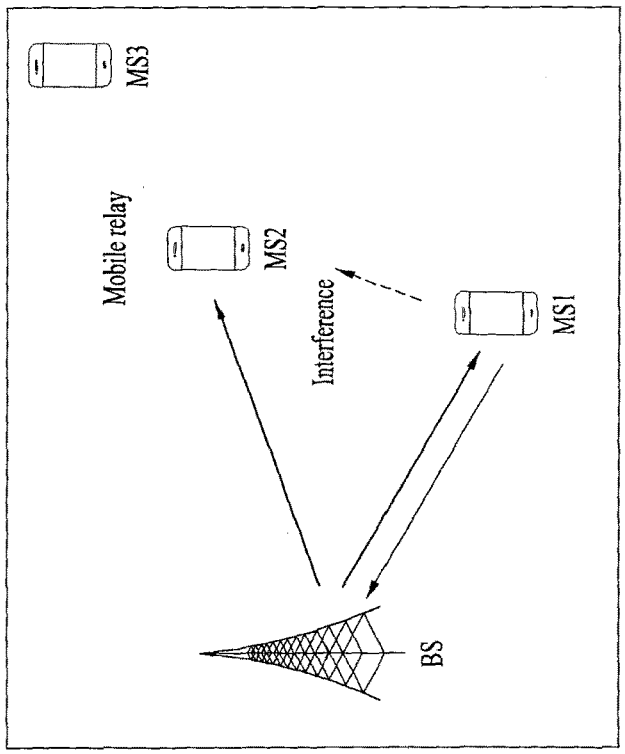

FIG. 9 shows an exemplary system to employ a preferred embodiment of the present invention.

In one embodiment of the present invention, an FDR communication scenario managed by a mobile relay shown in FIG. 9 is assumed. At this time, the mobile relay may be a base station (BS), a small BS or a mobile station. In the left of FIG. 9, the BS simultaneously transmits the same information to MS1 and MS2 and MS1 simultaneously transmits uplink information to the BS using the same frequency-time resources. MS2 operates as a mobile relay and thus transmits received downlink information to MS3. Accordingly, since a processing time for decoding the information received from the BS is required, MS2 transmits the information to MS3 after a predetermined time delay. In the right of FIG. 9, MS2 transmits a signal received on a previous frame/subframe to MS3 and, at the same time, receives new information from the BS. At this time, the signal transmitted from MS2, which is the mobile relay, to MS3 causes interference with the BS and the neighbor MS1. However, if information included in the interference signal caused by MS2 is broadcasting information known to MS1 and the BS, the interference may be differently defined.

The broadcasting information relayed by the mobile relay is known. This is because the BS simultaneously transmits the same information to the mobile relay and linked MSs. Since the mobile relay transmits the received information after a delay time (frame/subframe), the BS and the neighbor MS already know the information.

However, the BS and the neighbor MS may not accurately predict the signal transmitted by the mobile relay. This is because the mobile relay performs processing based on precoding, resource allocation information, modulation and coding information, etc. when transmitting a signal to a target MS but the BS and the neighbor MSs do not know such processing information.

Accordingly, in one embodiment of the present invention, the mobile relay (relay station) informs the BS or other MS(s) of information used for such processing such that the BS or other MS(s) performs interference management (interference cancellation) based on such information. That is, in the present invention, a method of utilizing interference caused by a mobile relay as a signal used for self-interference control in FDR communication is proposed.

Fundamentally, since the BS knows all signals relayed by the mobile relay, the BS may cancel self-interference using the self-interference cancellation principle applied to the general FDR environment and the neighbor MSs may utilize the self-interference cancellation principle with respect to the signal relayed by the mobile relay only when a signal relayed by the mobile relay is broadcasting information transmitted to all MSs. In the present embodiment, when the mobile relay transmits relaying information, a modulation and coding (MCS) scheme, beamforming and resource allocation information of the corresponding information is transmitted to the BS or neighbor MSs.

Figure 10:
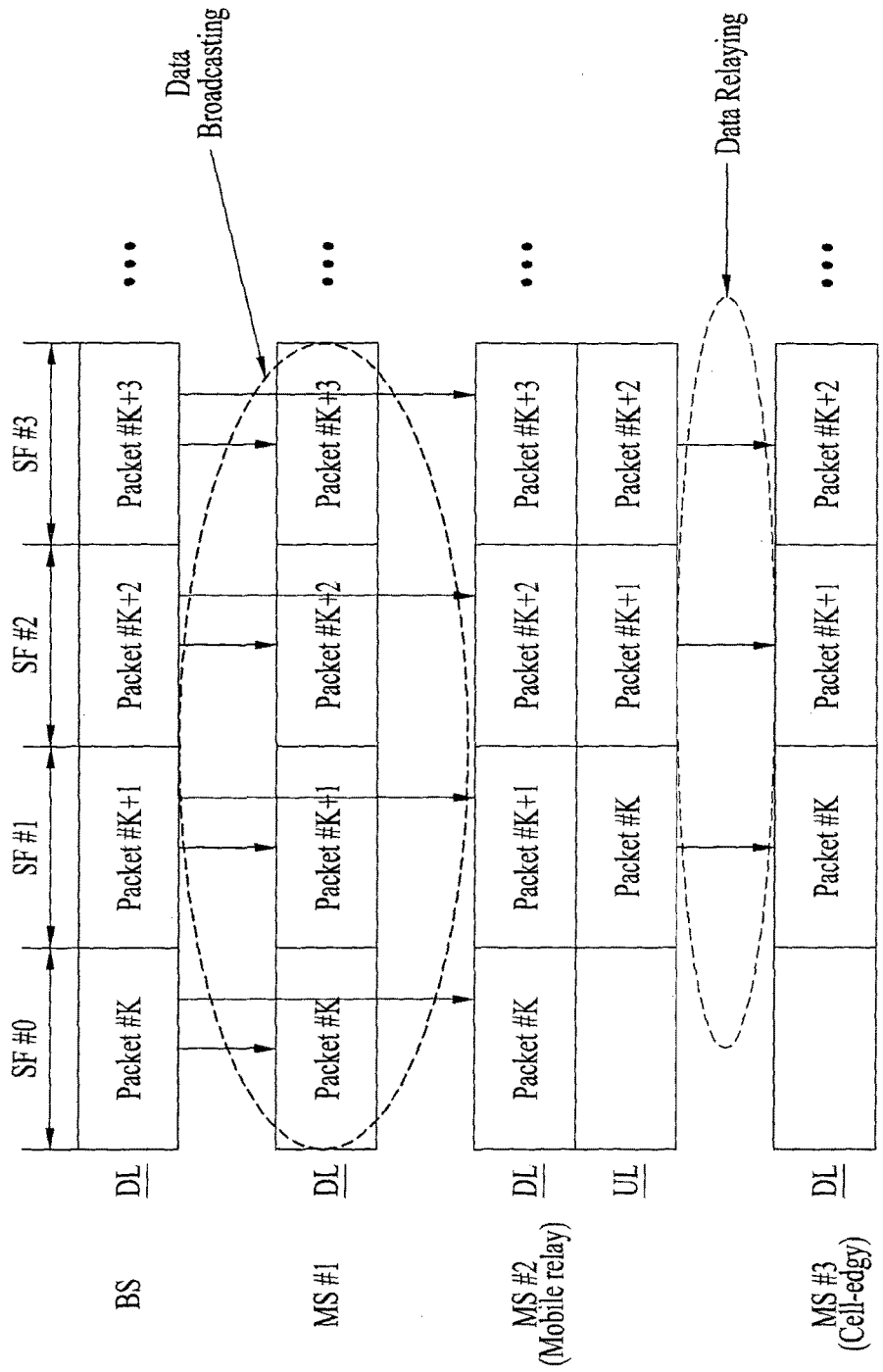
FIG. 10 is a diagram for explaining one embodiment of the present invention.

FIG. 10 is a diagram for explaining one embodiment of the present invention. MS2, which operates as the mobile relay of FIG. 10, relays information or packets transmitted from the BS to MSs located inside a cell to MS3 located outside the BS coverage.

More specifically, as shown in FIG. 10, assume that MS2, which operates as the mobile relay, transmits relaying information received on a previous subframe to MS3 (celledge MS) after "N-subframe" delay. For example, information received on SF (subframe) #0 is transmitted to MS3 on a next subframe SF#1 (in case of N=1). Accordingly, the mobile relay preferentially detects and decodes the broadcasting information transmitted by the BS.

At this time, the signal transmitted from the mobile relay to MS3 on the next frame may cause interference with the BS and MS1 which is the neighbor MS.

Figure 11:
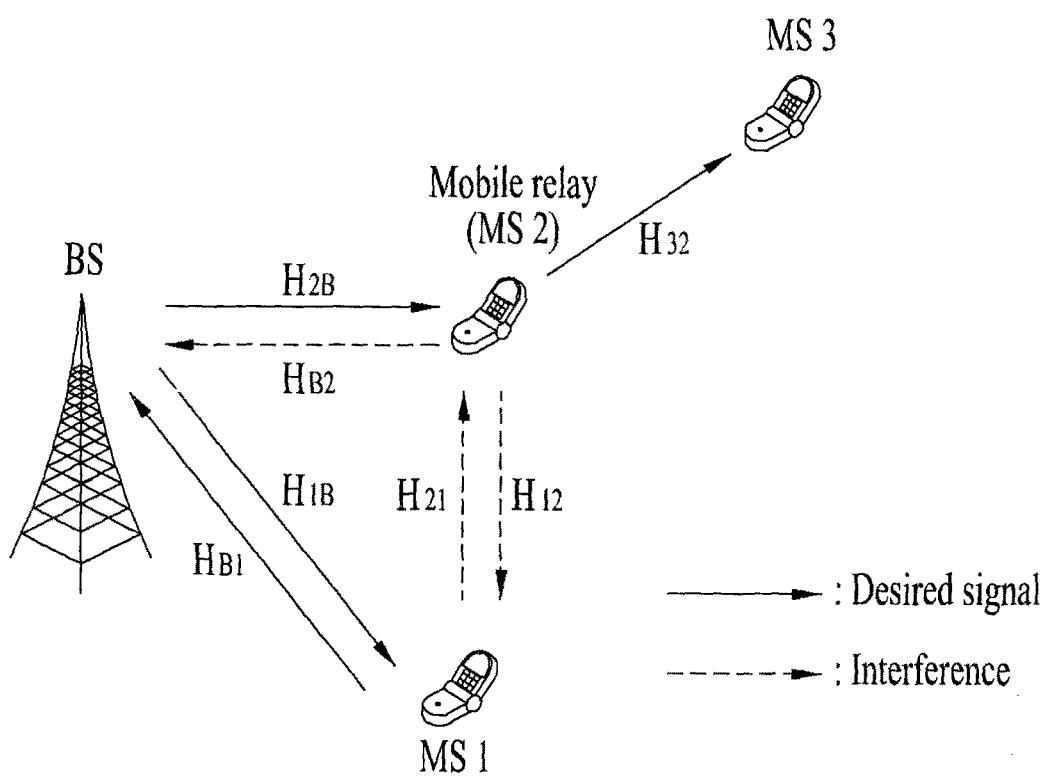
FIG. 11 shows a relationship between channels when MS2 operates as mobile relay.

FIG. 11 shows a relationship between channels when MS2 operates as mobile relay.

As shown in FIG. 11, if the mobile relay relays the same packets to MS3 with a delay time of 'N=1' subframe, signal vectors $r_{BS}$, $r_1$, $r_2$ received by the BS, the neighbor MS (MS1) and the mobile relay (MS2) are expressed by Equations 2 to 4 below.

$$r_{BS} = H_{B1} F_1 X_m + H_{B2} F_2 X'_k + n \qquad \text{[Equation 2]}$$

$$r_1 = H_{1B} F_{BS} X_{k+N} + H_{12} F_2 X'_k + n \qquad \text{[Equation 3]}$$

$$r_2 = H_{2B} F_{BS} X_{k+N} + H_{21} F_1 X_m + n \qquad \text{[Equation 4]}$$

Here, if UL/DL channel reciprocity is assumed, an uplink/downlink channel may be expressed by Equation 5 below.

$$H_{B2} = H_{2B}{}^T, \; H_{B1} = H_{1B}{}^T, \; H_{12} = H_{21}{}^T \qquad \text{[Equation 5]}$$

where, $F_{BS}$, $F_1$, $F_2$ denotes precoding matrices used by the BS, MS1 and MS2 for beamforming. For example, if beamforming is not performed, $F_{BS}$, $F_1$, $F_2$ become an I-matrix. $X_m$ denotes a UL data signal transmitted from the neighbor MS (MS1) to the BS and is not associated with the broadcasting information $X_k$. $X_{k'}$ denotes a signal obtained by decoding the information $X_k$ and performing channel coding and modulation (MCS) for transmission from the mobile relay (MS2) to the cell-edge MS (MS3).

Hereinafter, assume that subframe delay of the mobile relay is N=1.

When the BS detects a desired signal $H_{B1}F_1X_m$ transmitted by MS1 as shown in Equation 2, the BS should know information on the interference signal $H_{B2}F_2X'_k$ caused by the mobile relay in order to perform interference cancellation after reconstruction of the signal at the BS. The desired signal transmitted from the BS to the neighbor MS (MS1) becomes $H_{1B}F_{BS}X_{k+1}$. Here, $H_{12}F_2X'_k$ is an interference signal caused by the signal transmitted by the mobile relay.

In Equations 2 and 3, the interference component caused by the mobile relay (MS2) is information packet#K which has already been acquired on the previous subframe SF#0 by the BS and the neighbor MS (MS1). Accordingly, if the BS and the neighbor MS know the MCS scheme, beamforming information and resource allocation used to generate the signal transmitted by the mobile relay, each receiver may completely restore the signal transmitted by the mobile relay.

Figure 12:
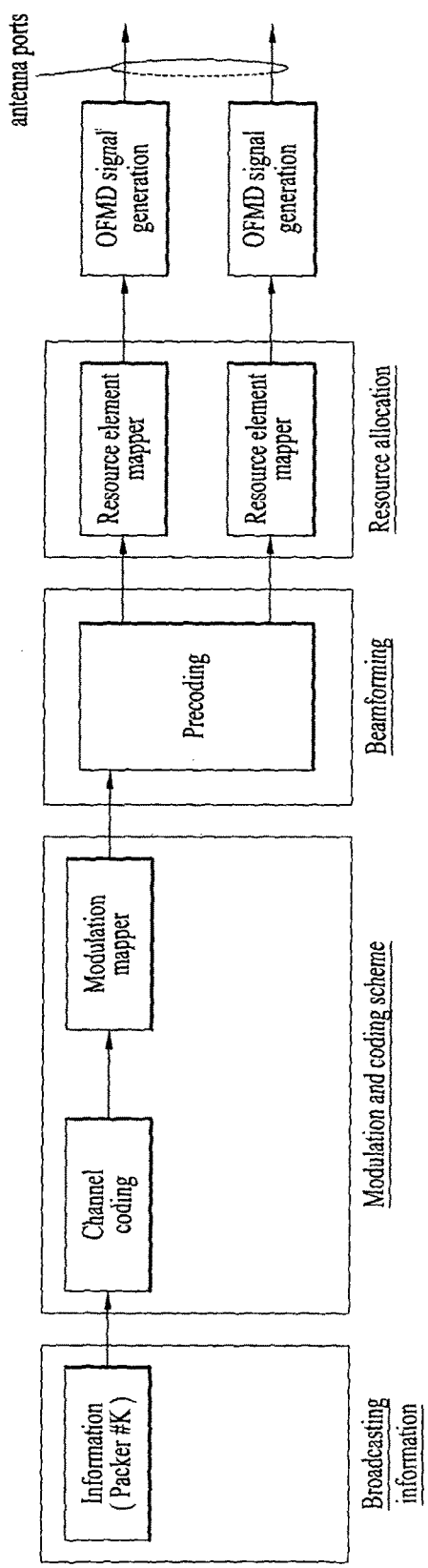
FIG. 12 shows an example of processing signals at relay station.

FIG. 12 shows an example of processing signals at a relay station.

As shown in FIG. 12, the mobile relay (relay station) may receive information 'packet#k', perform channel coding, modulation, precoding, resource mapping, OFDM signal generation, etc. and transmit the signal to the MS serviced thereby.

As shown in FIG. 12, the information 'packet#k' is possessed by the BS, the neighbor MS and the mobile relay. Accordingly, the neighbor MS and the BS may completely restore the information if the neighbor MS and the BS know the MCS/beamforming/resource allocation method of the broadcasting information performed by the mobile relay.

More specifically, the modulation and coding (MCS) scheme indicates information indicating that "packet#K" is transformed into $X'_k$, beamforming (generally, precoding) indicates $F_2$ and the resource allocation method indicates a time-frequency region allocation position of the relaying signal.

Accordingly, the mobile relay may implement interference cancellation when transmitting the relaying information and broadcasting the MCS/beamforming/resource allocation method to the neighbor MS and the BS. The method of generating the broadcasting information will now be described.

MCS (Modulation and Coding Scheme) Information

Figure 1:
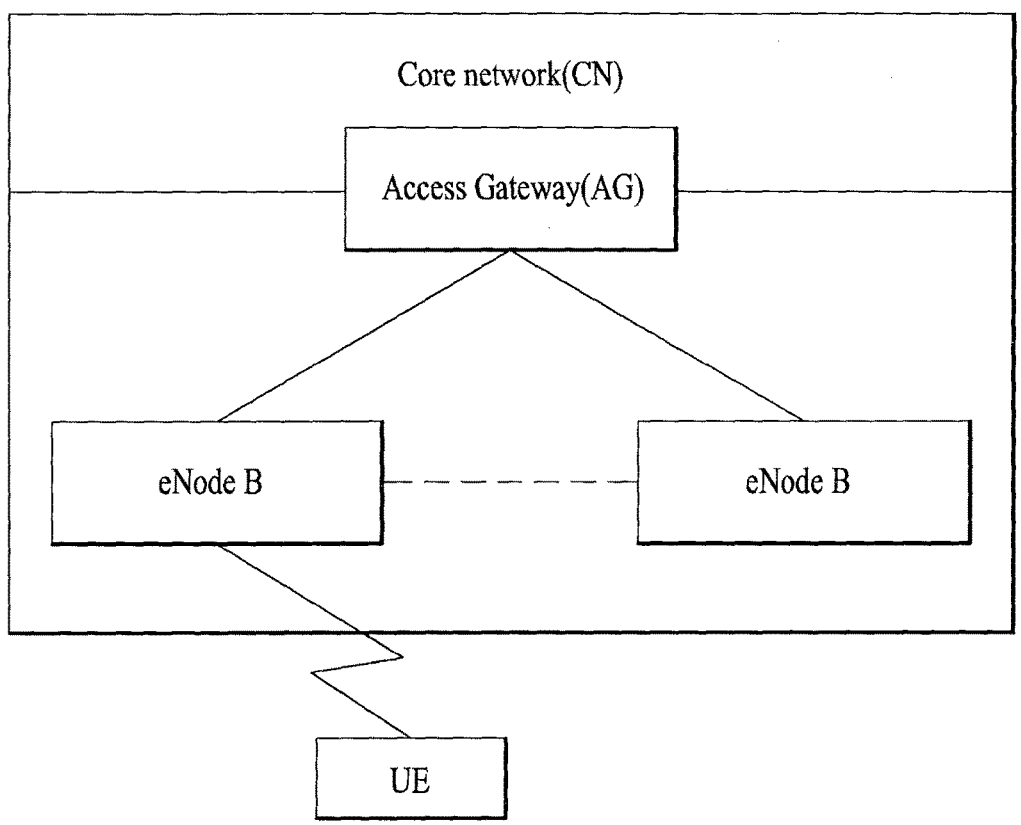
FIG. 1 is a diagram showing a network structure of an Evolved Universal Mobile Telecommunications System (E-UMTS) as an example of a wireless communication system.

The mobile relay may predetermine a set of code rates and QAM levels used to modulate the relaying information. If this set is predetermined, the information is transmitted in a simple bitmap format. For example, as shown in FIG. 1, a total of 16 types of code-rates and QAM levels are supported, 4-bit information is broadcast.

TABLE 1

| MCS Level/Index | Code-rate | QAM level | Broadcasting bits |
|---|---|---|---|
| 0 | 0.2 | QPSK(4QAM) | 0000 |
| 1 | 0.4 | | 0001 |
| 2 | 0.6 | | 0010 |
| 3 | 0.8 | | 0011 |
| 4 | 0.2 | 16QAM | 0100 |
| 5 | 0.4 | | 0101 |
| 6 | 0.6 | | 0110 |
| 7 | 0.8 | | 0111 |
| 8 | 0.2 | 64QAM | 1000 |
| 9 | 0.4 | | 1001 |

TABLE 1-continued

| MCS Level/Index | Code-rate | QAM level | Broadcasting bits |
|---|---|---|---|
| 10 | 0.6 | | 1010 |
| 11 | 0.8 | | 1011 |
| 12 | 0.2 | 256QAM | 1100 |
| 13 | 0.4 | | 1101 |
| 14 | 0.6 | | 1110 |
| 15 | 0.8 | | 1111 |

Beamforming Information

Beamforming generally precoding and an optimal beam should be formed in a direction of an MS, to which a signal will be relayed, based on an estimated channel. If beamforming is not applied, a beamforming matrix used by the mobile relay becomes $F_2 \rightarrow I_{Nt}$, that is, an I-matrix. A precoding matrix may also be predefined. For example, if a total of four precoding matrices is defined, 2-bit information is broadcast.

TABLE 2

| Codebook index | Number of layers υ | | Broadcasting bits |
|---|---|---|---|
| | 1 | 2 | |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ | 00 |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ | 01 |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ | 10 |
| 3 | $\frac{1}{\sqrt{2}}\begin{bmatrix}1\\-j\end{bmatrix}$ | — | 11 |

Resource Allocation Information

When the mobile relay uses fixed resources when relaying the broadcasting information to the neighbor MS, the neighbor MS and the BS may acquire the resource allocation information. Alternatively, the resource allocation information may be acquired via periodic signalling or semi-static configurations.

Channel Estimation

Assume that a channel between links may be generally estimated via a generally used pilot configuration.

In the above-described embodiment, the method of providing, to the BS and the neighbor MS(s), the information for processing the signal to be transmitted to the MS serviced thereby is proposed. In another embodiment of the present invention, a method of feeding MCS, precoding and resource allocation information of relaying information of a mobile relay back to a BS and, at the BS, broadcasting the same information to MSs located in a cell is proposed. By this method, the BS and the neighbor MS may acquire processing information used by the relay station and perform interference management.

In another embodiment, the mobile relay may simultaneously broadcast MCS, precoding and resource allocation information of the relayed information to the BS and neighbor MSs.

In another embodiment of the present invention, a BS and a neighbor MS regard an already known signal, which is transmitted by a mobile relay, as self-interference and cancel the signal. The BS and the neighbor MS may reconstruct the interference signal caused by the mobile relay at a receiver based on the broadcasting information. Accordingly, the same principle as the situation assumed upon self-interference cancellation of FDR is applicable. However, the same interference cancellation is possible not only when the BS sends the broadcasting information to all MSs but also when the mobile relay relays information to be transmitted only to a cell-edge MS.

Channel Estimation

Assume that a channel $H_{B2}$ between the mobile relay and the BS is already known via channel estimation. That is, the BS/MS may perform channel estimation when the mobile relay transmits a pilot signal for uplink transmission.

Precoding Information

Precoding information of $H_{B2}F_2X'_k$ means $F_2$. This can be confirmed via periodic broadcasting of the mobile relay if it is assumed that the cell-edge MS (MS3) is static.

Transmitted signal (modulation scheme): Mean final modulation information of $X'_k$ of $H_{B2}F_2X'_k$. That is, assume that, if channel coding and QAM modulation are performed, a combination is semi-statically selected. Accordingly, the final modulation signal $X'_k$ actually generated by the mobile relay can be confirmed.

Since the BS acquires all information on interference caused by the mobile relay, the information on interference is subtracted from the received signal after reconstruction of the corresponding signal. That is, if the reconstruction signal is subtracted from Equation 2, the following equation is obtained.

$$r_{BS} = H_{B1}F_1X_m + H_{B2}F_2X'_k + n - H'_{B2}F_2X'_k \quad \text{[Equation 6]}$$
$$= H_{B1}F_1X_m + e + n$$

where, e denotes a component including channel estimation errors or signal processing errors, which may occur even when information on the signal generated by the mobile relay is accurately known. However, it may be assumed that the value thereof is significantly low.

In addition, not only simple signal subtraction but also analogue cancellation and digital cancellation methods used for self-interference cancellation in FDR are applicable.

Hereinafter, an interference cancellation method for performing such a method will be described.

Figure 13:
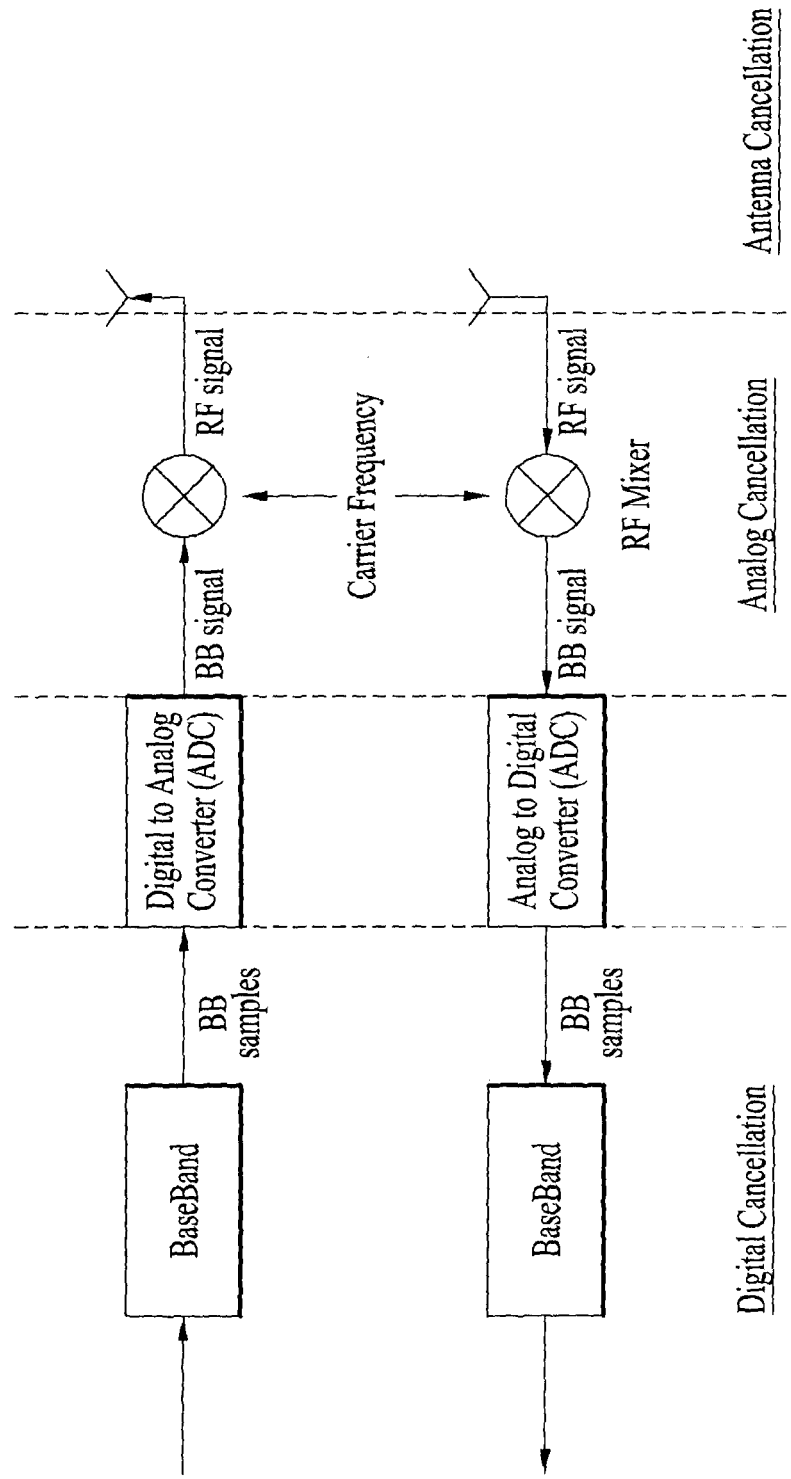
FIG. 13 shows examples for self interference cancellations.

FIG. 13 shows examples for self interference cancellations.

As described above, in general, self-interference means interference generated when a UE directly receives a signal transmitted thereby via a receive antenna. At this time, the strength of interference may be greater than the received signal by about 60 to 90 dB. A scheme for cancelling such self-interference includes three schemes as shown in FIG. 13. Maximum cancellation ranges of the schemes are as follows.

Antenna Cancellation: 20-30 dB
Analogue Cancellation: Max, 45 dB
Digital Cancellation: 20-25 dB Application positions of the methods are shown in FIG. 13. That is, digital cancellation is applicable before signals processed in a base band pass through a DAC or after the signals pass through an ADC. In digital cancellation, self interference cancellation (SIC) may be performed by applying various digital interference cancellation schemes such as beamforming and the range of digital cancellation is about 20 to 25 dB.

Next, analogue cancellation is processed at an RF signal after the DAC or before the ADC.

Figure 14:
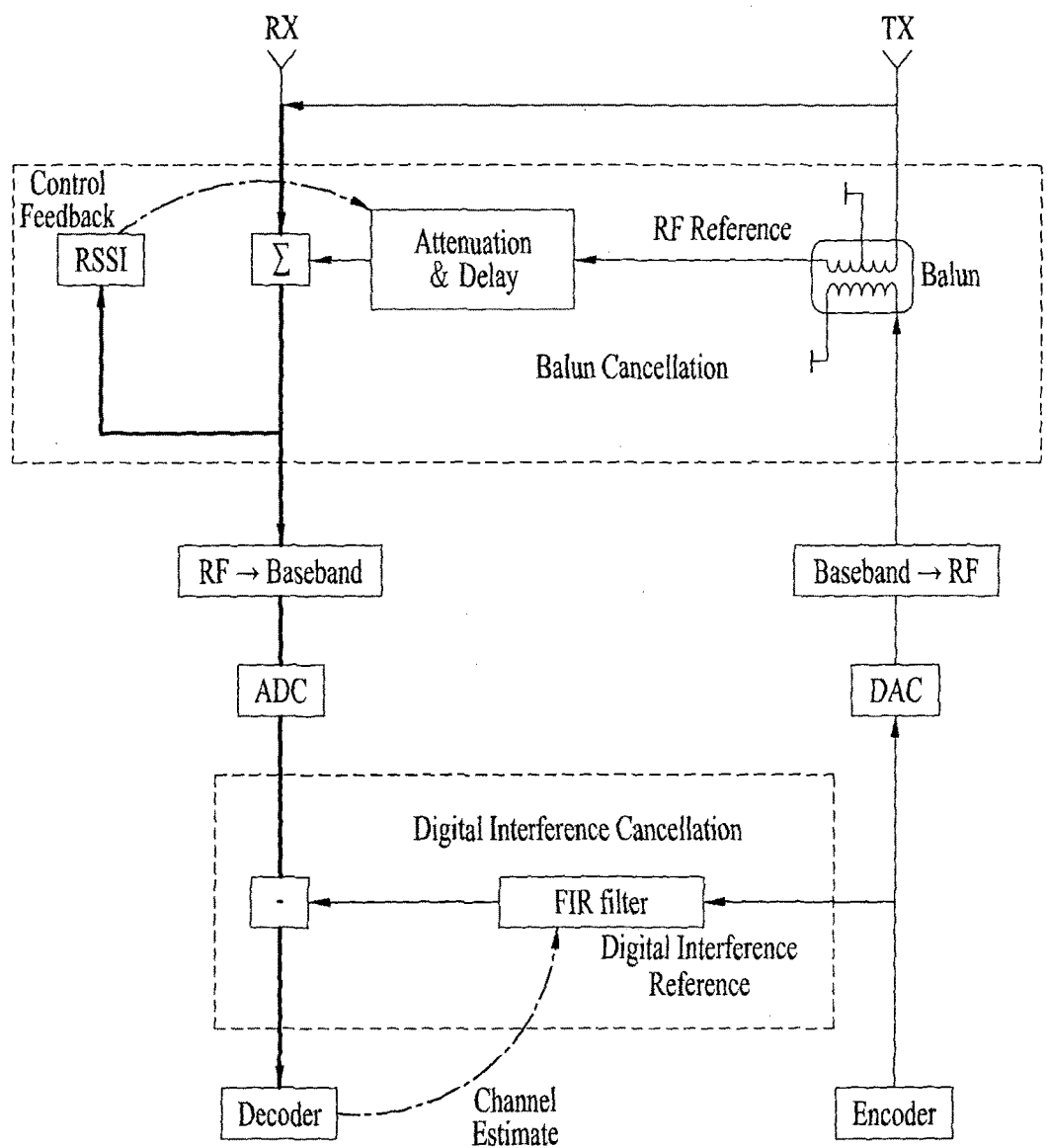
FIG. 14 shows an exemplary system employing Analogue/Digital interference cancellation in Full Duplex System.

FIG. 14 shows an exemplary system employing Analogue/Digital interference cancellation in a Full Duplex System.

As shown in FIG. 14, analogue cancellation means that a second transmit chain directly generates analogue cancellation signals via digital estimation of self-interference and an RX stage mixes the signals. Thus, SIC is performed. FIG. 14 shows the structure of a transmitter/receiver for implementing analogue interference cancellation and digital interference cancellation. That is, in the analogue interference cancellation scheme, the signal of the transmitter is inverted and generated and is mixed with the signal of the receiver such that the directly received Tx signal is cancelled.

Figure 15:
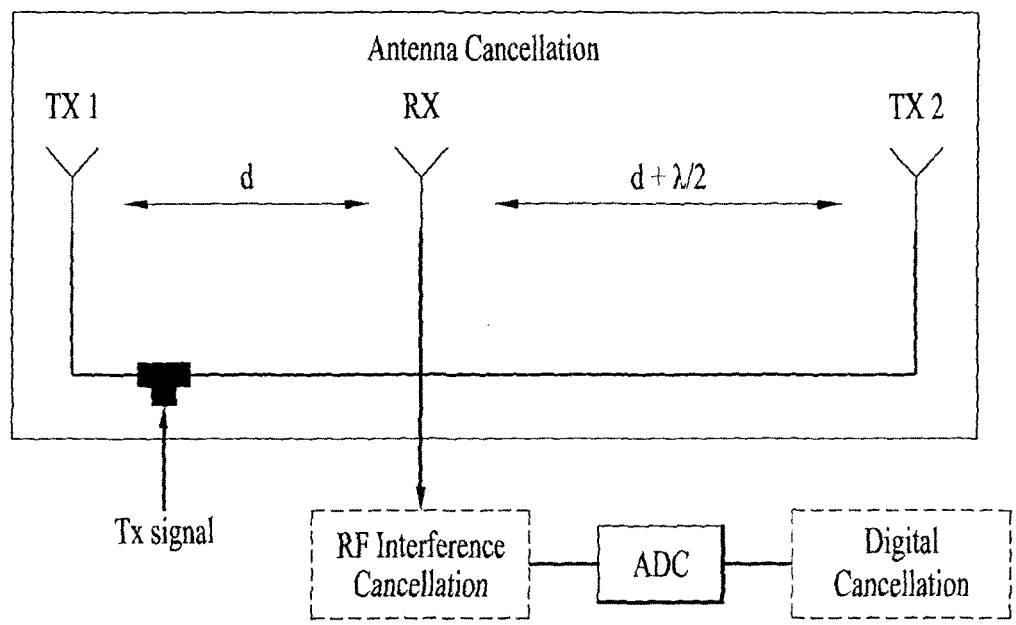
FIG. 15 shows an example for antenna cancellation.

FIG. 15 shows an example for antenna cancellation.

In a transceiver including two Tx antennas and 1 Rx antenna, when signals transmitted by the two Tx antennas are input to the Rx antenna, the phase of the signal is inverted by 180 degrees such that a phase difference between the signals transmitted by the two Tx antennas is 180 degrees. Thus, a signal obtained by mixing the signals received by the Rx antenna located between the Tx antennas is null, that is, 0. FIG. 15 shows simple implementation of such an antenna cancellation scheme. A difference between distances between the two Tx antennas and the Rx antennas is accurately λ/2. Accordingly, the difference between signal phases is 180 degrees.

In general, the antenna cancellation scheme has low complexity and simplest implementation characteristics. However, as described above, generally, the maximum cancellation performance of the antenna cancellation scheme is about 20 dB to 30 dB. However, for the FDR system, SIC performance of about 70 dB is required and may be generally achieved by combining the above-described three schemes.

However, there is a specific communication environment for maximizing performance of the antenna cancellation scheme and the present invention is preferably applicable to such a communication environment.

Figure 16:
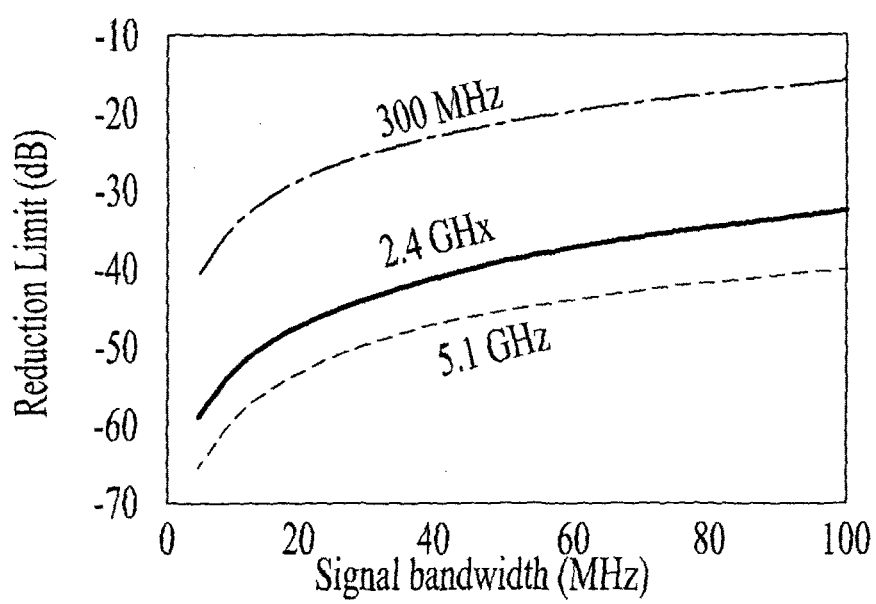
FIG. 16 shows an example of performance of antenna interference cancellation based on the signal bandwidth and center frequency.

FIG. 16 shows an example of performance of antenna interference cancellation based on the signal bandwidth and center frequency.

In general, as system bandwidth is decreased and a center frequency is increased, performance of antenna IC is rapidly increased. FIG. 16 shows a graph showing performance of antenna IC. As can be seen from the graph, the cancellation graph is shifted downwardly as the center frequency is increased and the graph is shifted to the left as system bandwidth is decreased.

Accordingly, insight may be derived from such a phenomenon. If a high-frequency narrow band is allocated to an FDR communication region, sufficient SIC performance may be guaranteed only using antenna cancellation and thus FDR performance may be guaranteed and implementation complexity may also be decreased. In general, since a high-frequency transmission band aims for wideband communication for performing transmission using a wide frequency band, if some region of the high-frequency transmission band is set to an FDR zone, an environment which is advantageous in self-interference cancellation via antenna IC may be established to obtain sufficient performance.

Hereinafter, as a self-interference cancellation method, zero-forcing filtering and MMSE filtering will be described.

Zero-Forcing filtering refers a simplest method for improving performance via null space projection at a transmitter and a receiver. That is, an eigenvalue 0 of an interference channel $H_I$ projects an interference signal to rank. Then, a signal is transmitted by the transmitter but has no influence on the receiver. Such ZF filtering may be simply implemented and thus are applicable to both the transmitter and the receiver. Tx filtering and Rx filtering implemented in the transmitter and the receiver may be simply implemented using the following pseudo-inverse matrix as shown in Equations 7 and 8.

$$\text{Tx filtering } G_{tx} = \begin{cases} I - (H_I)^+ H_I \\ I \end{cases} \rightarrow N_{tx} \times N_{tx} \qquad \text{[Equation 7]}$$

$$\text{Rx filtering: } G_{rx} = I - H_I(H_I)^+ \rightarrow N_{rx} \times N_{rx} \qquad \text{[Equation 8]}$$

$(\bullet)^\dagger$ denotes a pseudo-inverse matrix.

The received signal to which filtering is applied is finally changed from Equation 1 to Equation 9. Here, if complete self-interference cancellation is performed, $G_{rx} H_I G_{tx} \approx 0$ and only the desired signal and noise remain.

$$r = G_{rx}(H_D X_D + H_I G_{tx} X_I + n) \qquad \text{[Equation 9]}$$
$$= G_{rx} H_D X_D + G_{rx} H_I G_{tx} X_I + G_{rx} n$$

Meanwhile, MMSE filtering is applied to the receiver. That is, mean square error (MSE) is minimized in the received signal. Accordingly, as Tx filtering, ZF Tx filtering is applicable without change. In this case, overall interference cancellation performance improvement may be expected. Self-interference cancellation is possible only via MMSE Rx filtering and a method of applying the same $G_{tx}$ as ZF to the transmitter and applying MMSE filtering to only $G_{rx}$ is shown in Equations 10 and 11 below.

$$\text{Tx filtering } G_{tx} = \begin{cases} I - (H_I)^+ H_I \\ I \end{cases} \rightarrow N_{tx} \times N_{tx} \qquad \text{[Equation 10]}$$

$$\text{Rx filtering: } G_{rx} = H_D(H_D)^H (H_D(H_D)^H + H_I(H_I)^H) + \sigma_n^2 I_{N_{rx}})^{-1} \rightarrow N_{rx} \times N_{rx} \qquad \text{[Equation 11]}$$

The received signal to which MMSE Rx filtering is applied is finally changed from Equation 1 to Equation 12 below. That is, the same equation as Equation 9 to which ZF Rx filtering is applied is obtained and only $G_{rx}$ is finally implemented as shown Equation 11.

$$r = G_{rx}(H_D X_D + H_I G_{tx} X_I + n) \qquad \text{[Equation 12]}$$
$$= G_{rx} H_D X_D + G_{rx} H_I G_{tx} X_I + G_{rx} n$$

As described above, in the present invention, a method for cancelling interference between a UE serving as a mobile relay and a mobile base station in communication between a UE and a base station in a full-duplex radio (FDR) communication environment in which simultaneous transmission and reception is performed using the same time-frequency resources will be described. Unlike time division duplex (TDD) or frequency division duplex (FDD) which is a half-duplex mode, in FDR, since a base station and a UE simultaneously perform transmission and reception using resources of the same time-frequency region, uplink/downlink interference simultaneously occurs between transmission and reception links. Since a mobile relay which is a use case of FDR may reproduce unnecessary interference due to interference characteristics of FDR, interference caused by the mobile relay should be controlled in order to sufficiently guarantee communication performance. In the present invention, a self-interference cancellation method of FDR is used to process link-to-link interference caused by a desired signal transmitted by a mobile relay. Therefore, it is possible to guarantee stable reception performance at receivers of a base station and a neighbor UE.

Hereinafter, the configuration of an apparatus for performing the above-described methods will be described.

Figure 17:
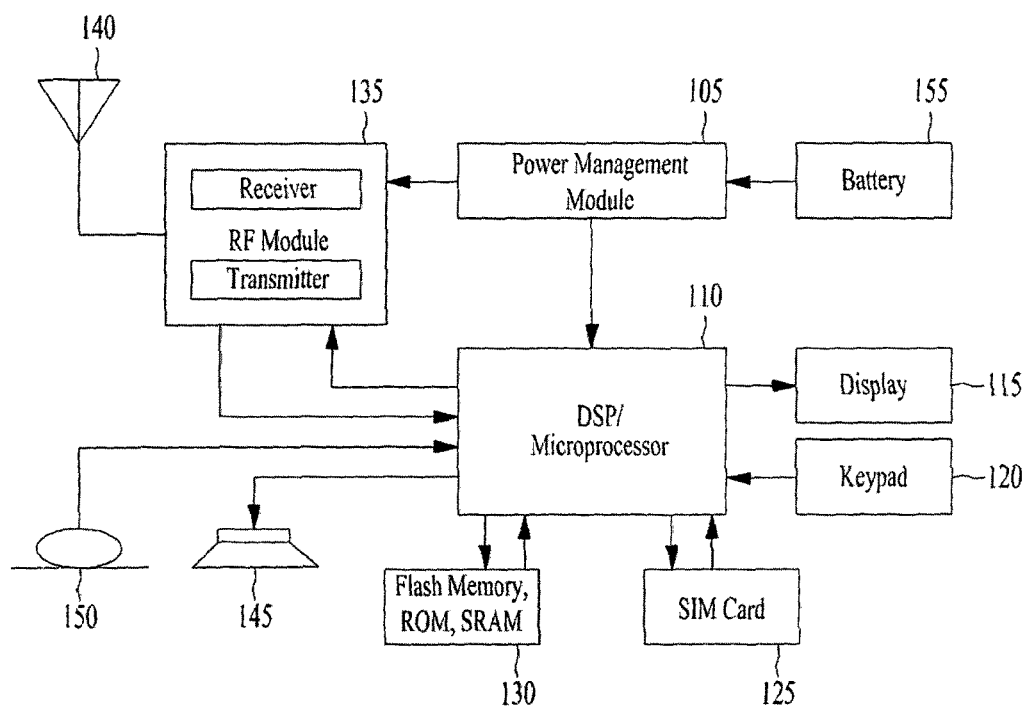
FIG. 17 is a block diagram of a communication apparatus according to an embodiment of the present invention.

FIG. 17 is a block diagram of a communication apparatus according to an embodiment of the present invention.

The apparatus shown in FIG. 17 can be a relay station, a user equipment (UE) and/or eNB adapted to perform the above mechanism, but it can be any apparatus for performing the same operation.

As shown in FIG. 17, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for receiving signals by a first station, which is a mobile station directly served by a base station, from the base station in a wireless communication system, the method comprising:
   receiving a first signal from the base station in a first time interval;
   acquiring from a second station which is a relay station, information on a specific processing scheme applied to the second station for processing the first signal to be transmitted to a third station, which is another mobile station served by the relay station; and
   receiving a second signal from the base station in a second time interval while the second station transmits the first signal, which is processed according to the specific processing scheme applied to the second station, to the third station,
   wherein the first time interval and the second time interval are different time intervals,
   wherein the receiving the second signal from the base station comprises obtaining the second signal which is transmitted from the base station by cancelling interference caused by the first signal from the second station based on knowledge on the first signal and the information on the specific processing scheme among received signals in the second time interval.

2. The method of claim 1, wherein the specific processing scheme comprises one or more of a modulation and coding scheme, a precoding scheme, or a resource allocation scheme.

3. The method of claim 1, wherein the first signal is a broadcast signal broadcasted by the base station to multiple stations including the second station.

4. The method of claim 1, wherein the information on the specific processing scheme is acquired by receiving the information on the specific processing scheme from the second station.

5. The method of claim 1, wherein the information on the specific processing scheme is acquired by estimating the information on the specific processing scheme at the first station.

6. The method of claim 1, wherein the information on the specific processing scheme is acquired by receiving the information on the specific processing scheme from the base station.

7. A method for receiving signals by a base station in a wireless communication system, the method comprising:
transmitting a first signal to a first station which is a relay station in a first time interval;
receiving from the first station, information on a specific processing scheme applied to the first station for processing the first signal to be transmitted to a second station directly served by the first station; and
receiving a second signal from a third station in a second time interval while the first station transmits the first signal to the second station,
wherein the first time interval and the second time interval are different time intervals,
wherein the receiving the second signal from the third station comprises obtaining the second signal which is transmitted from the third station by cancelling interference caused by the first signal from the first station based on knowledge on the first signal and the information on the specific processing scheme among received signals in the second time interval.

8. A method for relaying signals by a first station, which is a relay station, in a wireless communication system, the method comprising:
receiving a signal, which is to be transmitted to a second station directly served by the first station, from a base station in a first time interval;
processing the received signal based on a specific scheme;
transmitting the processed signal to the second station in a second time interval while at least one of the base station or a third station directly served by the base station is receiving another signal,
wherein the first time interval and the second time interval are different time intervals; and
transmitting information on the specific scheme to at least one of the base station or the third station.

9. The method of claim 8, wherein the information on the specific scheme is used for at least one of the base station or the third station to manage interference caused by the transmission of the processed signal to the second station.

10. The method of claim 9, wherein at least one of the base station or the third station has knowledge on the received signal, and
wherein at least one of the base station or the third station manages the interference based on the knowledge on the received signal and the information on the specific scheme.

11. The method of claim 8, wherein the wireless communication system uses an FDR (Full-duplex radio) communication scheme.

12. A device operating as a first station, which is a mobile station directly served by a base station, for receiving signals from the base station in a wireless communication system, the device comprising:
a transceiver for transmitting and receiving a signal to and from a base station and/or a second station which is a relay station; and
a processor operatively coupled to the transceiver, wherein the processor is configured to:
receive a first signal from the base station in a first time interval;
acquire from the second station, information on a specific processing scheme applied to the second station for processing the first signal to be transmitted to a third station, which is another mobile station served by the relay station; and
receive a second signal from the base station in a second time interval while the second station transmits the first signal, which is processed according to the specific processing scheme applied to the second station, to the third station,
wherein the first time interval and the second time interval are different time intervals,
wherein the receiving the second signal from the base station comprises obtaining the second signal, which is transmitted from the base station, by cancelling interference caused by the first signal from the second station based on knowledge on the first signal and the information on the specific processing scheme among received signals in the second time interval.

13. A device operating as a base station in a wireless communication system, the device comprising:
a transceiver for transmitting and receiving a signal to and from a first station which is a relay station or another station; and
a processor operatively coupled to the transceiver, wherein the processor is configured to:
transmit a first signal to the first station, which is a relay station in a first time interval;
receive from the first station, information on a specific processing scheme applied to the first station for processing the first signal to be transmitted to a second station directly served by the first station; and
receive a second signal from a third station in a second time interval while the first station transmits the first signal to the second station,
wherein the first time interval and the second time interval are different time intervals,
wherein the receiving the second signal from the third station comprises obtaining the second signal, which is transmitted from the third station, by cancelling interference caused by the first signal from the first station based on knowledge on the first signal and the information on the specific processing scheme among received signals in the second time interval.

14. A device operating as a first station for relaying signals in a wireless communication system, the device comprising:
a transceiver for receiving a signal from a base station; and
a processor operatively coupled to the transceiver, wherein the processor is configured to:
receive a signal, which is to be transmitted to a second station directly served by the first station, from the base station in a first time interval;

process the received signal based on a specific scheme;
transmit the processed signal to the second station in a second time interval while at least one of the base station or a third station directly served by the base station is receiving another signal,
wherein the first time interval and the second time interval are different time intervals; and
transmit information on the specific scheme to at least one of the base station or the third station.

\* \* \* \* \*